United States Patent
Ahmad et al.

(10) Patent No.: US 12,541,743 B2
(45) Date of Patent: Feb. 3, 2026

(54) STORAGE AND RETRIEVAL SYSTEM

(71) Applicant: Ocado Innovation Limited, Hatfield (GB)

(72) Inventors: Amaan Ahmad, Hatfield (GB); Andrew Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 19/243,934

(22) Filed: Jun. 20, 2025

(65) Prior Publication Data
US 2025/0315788 A1 Oct. 9, 2025

Related U.S. Application Data

(63) Continuation of application No. PCT/EP2023/086360, filed on Dec. 18, 2023.

(30) Foreign Application Priority Data

Dec. 22, 2022 (GB) ..................... 2219525

(51) Int. Cl.
G06Q 10/0875 (2023.01)
G06V 10/25 (2022.01)

(52) U.S. Cl.
CPC ......... G06Q 10/0875 (2013.01); G06V 10/25 (2022.01); G06V 2201/07 (2022.01)

(58) Field of Classification Search
CPC . G06Q 10/0875; G06V 10/25; G06V 2201/07
See application file for complete search history.

(56) References Cited

U.S. PATENT DOCUMENTS

| | | | |
|---|---|---|---|
| 2021/0192780 A1 | 6/2021 | Kulkarni et al. | |
| 2021/0304122 A1 | 9/2021 | Dattamajumdar et al. | |
| 2022/0067436 A1 | 3/2022 | Larson et al. | |
| 2023/0174258 A1* | 6/2023 | Lian .................. | G06T 7/13 53/475 |

OTHER PUBLICATIONS

International Search Report and Written Opinion mailed Apr. 15, 2024 in corresponding International Patent Application No. PCT/EP2023/086360, 9 pages.

* cited by examiner

Primary Examiner — Allen C Chein
(74) Attorney, Agent, or Firm — Dinsmore & Shohl LLP

(57) ABSTRACT

A method of operating a storage and retrieval system comprising a plurality of storage containers. The method comprises, for each storage container, storing a contents record comprising, for each item previously determined to be contained in the storage container, an item type and a bounding box. Upon receiving an indication that an item of a specified item type has been added to plurality of contents of a selected storage container: capturing one or more images of the plurality of contents; processing the images to detect individual items and generate a current bounding box for each; identifying one of the current bounding boxes as relating to the added item; and updating the contents record to include, for the added item, the specified item type and the identified current bounding box.

18 Claims, 7 Drawing Sheets

STORAGE AND RETRIEVAL SYSTEM

CROSS-REFERENCE TO RELATED APPLICATIONS

This Application is a continuation of PCT International Patent Application No. PCT/EP2023/086360, filed on Dec. 18, 2023, which claims priority to UK Patent Application No. GB2219525.9, filed on Dec. 22, 2022, the entire contents of each of which are hereby incorporated by reference.

TECHNICAL FIELD

The disclosure herein relates to storage and retrieval systems and methods for operating such systems. In particular, the disclosure provides methods of operating such systems that improve the efficiency with which items are stored and retrieved, and apparatuses for implementing such methods.

BACKGROUND

A warehouse facility typically includes a receiving operation for receiving and processing shipments of items from various vendors before they are stored in the warehouse. The received items may be decanted into containers and stored in a storage and retrieval system, such as the system disclosed in WO2015/185628A1, in which stacks of storage containers filled with items are arranged within a grid structure that provides the storage portion of the system. The storage containers are accessed by load handling devices operative on tracks located on the top of the grid structure. To fulfil a customer order, one or more storage containers are retrieved from the storage portion by the load handling devices and transported to a picking station, at which the ordered products are picked out of the containers, e.g. by a manual picker or by a robotic picking device.

To enable items to be retrieved from within such a storage and retrieval system it is therefore necessary to maintain a record of which items are stored in each storage container, and to track the location of the storage containers in the storage portion. To this end, the conventional approach is to ensure that each storage container containers only a single type of item (e.g. items of a single Stock Keeping Unit (SKU)). This approach simplifies the decant operation, in which received items are deposited into one of the storage containers at a decant station, and simplifies the process of identifying and locating a storage container that holds an item of a desired type. In particular, using this approach it is only necessary to store an identifier for each storage container, a location for each storage container within the storage portion of the system, and a single item identifier that identifies the type of item that is contained within the storage container.

Whilst this conventional approach simplifies some of the operations, it leads to a non-optimal usage of the space available within a storage container, which leads to an increase in the number of storage containers required to store a number of items of varying types and consequently increases the size of the storage portion that is required to store those items.

It is against this background that the present invention has been devised.

SUMMARY

According to a first aspect, there is provided a computer-implemented method of operating a storage and retrieval system comprising a plurality of storage containers. The method comprises, for each storage container, storing a contents record for the storage container, the contents record comprising, for each item previously determined to be contained in the storage container, an item type and a bounding box. The method further comprises, upon receiving an indication that an item of a specified item type has been added to the contents of a selected storage container of the plurality of storage containers: (i) capturing one or more images of the contents of the selected storage container, (ii) processing the one or more images to detect individual items and generate a current bounding box for each detected item, (iii) identifying one of the current bounding boxes as relating to the added item by comparing the current bounding boxes with the bounding boxes stored in the contents record, and (iv) updating the contents record of the selected storage container to include, for the added item, the specified item type and the identified current bounding box.

The step of identifying one of the current bounding boxes as relating to the added item may comprise comparing the current bounding boxes with the bounding boxes stored in the contents record to identify one of the current bounding boxes that does not match any of the bounding boxes stored in the contents record. The step of identifying one of the current bounding boxes as relating to the added item may then comprise, for each of the bounding boxes stored in the contents record, matching the stored bounding box to one of the current bounding boxes, and identifying the current bounding box that does not match one of the stored bounding boxes as relating to the added item. The step of matching the stored bounding box to one of the current bounding boxes may comprise identifying any of the current bounding boxes that have dimensions that correspond to respective dimensions of the stored bounding box.

The step of matching the stored bounding box to one of the current bounding boxes may comprise identifying any of the current bounding boxes that have dimensions that are within a predefined range of the respective dimensions of the stored bounding box. The predefined range may be defined as a percentage of the corresponding dimensions of the stored bounding box. The step of matching the stored bounding box to one of the current bounding boxes may comprise, for each of the current bounding boxes, determining if the dimensions of the current bounding box are within the predefined range of the respective dimensions of the stored bounding box.

The step of matching the stored bounding box to one of the current bounding boxes may further comprise, if only a single one of the current bounding boxes is identified as having dimensions that correspond to respective dimensions of the stored bounding box, matching the identified current bounding box to the stored bounding box. The step of matching the stored bounding box to one of the current bounding boxes may further comprise, if a plurality of the current bounding boxes are identified as having dimensions that correspond to respective dimensions of the stored bounding box, matching the stored bounding box to one of the plurality of current bounding boxes that has a center that is closest to a center of the stored bounding box.

The method may further comprise, after updating the contents record of the selected storage container, transporting the selected storage container to a storage portion of the storage system. The method may further comprise, upon receiving a request to retrieve an item of the specified item type, performing a lookup in the contents records of the plurality of storage containers, identifying the selected storage container as containing an item of the specified item type, and retrieving the selected storage container from the storage portion of the storage system. The method may further comprise, upon retrieving the selected storage container from the storage portion of the storage system, delivering the storage container to a pick station of the storage system, the pick station being arranged to enable items to be removed from the contents of the selected storage container.

The item may be added to the selected storage container at a decant station of the storage system, the decant station being arranged to enable items to be added to the contents of the selected storage container and comprising an image capture device arranged to capture images of the contents of the selected storage container. The method may then further comprise retrieving the storage container from the storage portion of the storage system, and delivering the storage container to the decant station of the storage system. The decant station may comprise a scanner arranged to scan a machine-readable element associated with the item (e.g. a barcode, QR code, RFID tag, NFC tag etc.) in order to obtain item type information for the item.

The item may be added to the selected storage container at an inventory handling station of the storage system, the inventory handling station being arranged to enable items to be added to and removed from the contents of the selected storage container and comprising an image capture device arranged to capture images of the contents of the selected storage container. The method may then further comprise retrieving the storage container from the storage portion of the storage system, and delivering the storage container to the inventory handling station of the storage system.

According to a second aspect, there is provided a computer-implemented method of operating a storage and retrieval system comprising a plurality of storage containers. The method comprises, for each storage container, storing a contents record for the storage container, the contents record comprising, for each item previously determined to be contained in the storage container, an item type and a bounding box. The method further comprises, upon receiving a request to retrieve an item of a target item type from a selected storage container of the plurality of storage containers: (i) capturing one or more images of the selected storage container, (ii) processing the one or more images to detect individual items and generate a current bounding box for each detected item, (iii) identifying one of the current bounding boxes as relating to an item of the target item type by comparing the current bounding boxes with the bounding boxes stored in the contents record, and (iv) generating a picking instruction indicating a location of an item of the target type in the selected storage container using the identified current bounding box.

The method may further comprise, upon confirmation that an item of the target item type has been removed from the contents of the storage container, updating the contents record of the storage container to reflect the removal of the item from the storage container. The method may further comprise, after generating the picking instruction, obtaining information identifying an item type of an item that has been removed from the contents of the storage container and comparing the identified item type to the target item type, wherein: (i) if the identified item type matches the target item type, confirming that the an item of the target item type has been removed, and (ii) if the identified item type does not match the target item type, generating a notification that the target item has not been removed.

The step of identifying one of the current bounding boxes as relating to an item of the target item type may comprise comparing the current bounding boxes with the bounding boxes stored in the contents record to identify one of the current bounding boxes that matches the bounding box stored in the contents record for an item of the target item type. The step of identifying one of the current bounding boxes as relating to an item of the target item type may comprise, for each of the bounding boxes stored in the contents record, matching the stored bounding box to one of the current bounding boxes, and identifying the current bounding box that matches the bounding box stored in the contents record for an item of the target item type.

The step of matching the stored bounding box to one of the current bounding boxes may comprise identifying any of the current bounding boxes that have dimensions that correspond to respective dimensions of the stored bounding box. The step of matching the stored bounding box to one of the current bounding boxes may comprise determining if the dimensions of any of the current bonding boxes are within a predefined range of the respective dimensions of the stored bounding box. The predefined range may be 15% of the corresponding dimensions of the stored bounding box. The step of matching the stored bounding box to one of the current bounding boxes may comprise, for each of the current bounding boxes, determining if the dimensions of the current bounding box are within the predefined range of the respective dimensions of the stored bounding box.

The step of matching the stored bounding box to one of the current bounding boxes may further comprise, if only a single one of the current bounding boxes is identified as having dimensions that correspond to respective dimensions of the stored bounding box, matching the identified current bounding box to the stored bounding box. The step of matching the stored bounding box to one of the current bounding boxes may further comprise, if a plurality of the current bounding boxes are identified as having dimensions that correspond to respective dimensions of the stored bounding box, matching the stored bounding box to one of the plurality of current bounding boxes that has a center that is closest to a center of the stored bounding box.

The method may further comprise, upon receiving a request to retrieve an item of a target item type, performing a lookup in the contents records of the plurality of storage containers, identifying the selected storage container as containing an item of the target item type, and retrieving the selected storage container from the storage portion of the storage system. The method may further comprise upon retrieving the storage container from the storage portion of the storage system, delivering the storage container to a pick station of the storage system, the pick station being arranged to enable items to be removed from the contents of the storage container and comprising an image capture device arranged to capture images of the contents of the storage container. The pick station may comprise a scanner arranged to scan a machine-readable element associated with an item that has been removed from the contents of the storage container in order to obtain information identifying an item type of the item that has been removed. The method may further comprise, after updating the contents record of the storage container to reflect the removal of the item from the storage container, transporting the storage container to the storage portion of the storage system The step of generating a picking instruction indicating a location of an item of the target type in the storage container may comprise any one or more of: (i) generating a visual representation of the identified current bounding box on a captured image of the contents of the storage container, and displaying a combined image comprising the captured image together with the visual representation of the bounding box, (ii) using one or more light sources to illuminate the location of the item of the target type defined by the identified bounding box, and (iii) transmitting a picking instruction message to a robotic picking device, the picking instruction message include the location of the item of the target type as defined by the identified bounding box.

According to a third aspect, there is provided a computer-implemented method of operating a storage system comprising a plurality of storage containers. The method comprises the method according to the first aspect and the method according to the second aspect. The items may be added to each of the plurality of storage containers using the method according the first aspect and items are removed from the each of the plurality of storage containers using the method according to the second aspect.

According to a fourth aspect, there is provided a computer-implemented method of operating a storage and retrieval system comprising a plurality of storage containers. The method comprises, for each storage container, storing a contents record for the storage container, the contents record comprising, for each item previously determined to be contained in the storage container, an item type and a bounding box. The method further comprises, upon receiving an indication that an item of a specified item type has been added to the contents of a select storage container of the plurality of storage containers: (i) capturing one or more first images of the contents of the selected storage container, (ii) processing the one or more first images to detect individual items and generate a first bounding box for each detected item, (ii) identifying one of the first bounding boxes as relating to the added item by comparing the first bounding boxes with the bounding boxes stored in the contents record, and (iv) updating the contents record of the selected storage container to include, for the added item, the specified item type and the identified first bounding box. The method further comprises, upon subsequently receiving a request to retrieve an item of the specified item type from the selected storage container: (v) capturing one or more second images of the selected storage container, (vi) processing the one or more second images to detect individual items and generate a second bounding box for each detected item (vii) identifying one of the second bounding boxes as relating to an item of the specified item type by comparing the second bounding boxes with the bounding boxes stored in the contents record, and (viii) generating a picking instruction indicating a location of an item of the specified type in the selected storage container using the identified second bounding box.

The step of receiving a request to retrieve an item of the specified item type from the selected storage container may comprise receiving a request to retrieve an item of the specified item type, performing a lookup in the contents records of the plurality of storage containers, and identifying the selected storage container as containing an item of the specified item type. The method may further comprise, after updating the contents record of the selected storage container, transporting the selected storage container to a storage portion of the storage system. The method may further comprise, upon receiving a request to retrieve an item of the first item type from the selected storage container, retrieving the selected storage container from the storage portion of the storage system.

According to a fifth aspect, there is provided a storage and retrieval system arranged to store items in a plurality of storage containers. The storage and retrieval system comprises: (a) a memory storing a contents record for each storage container, each contents record comprising, for each item previously determined to be contained in the storage container, an item type and a bounding box, (b) an input device arranged to receive an indication that an item of a specified item type has been added to the contents of a selected storage container of the plurality of storage containers, (c) one or more image capture devices arranged to capture one or more images of the contents of the selected storage container, and (d) one or more processors. The one or more processors are configured to, upon receiving the indication that an item of a specified item type has been added to the contents of the selected storage container: (i) cause the one or more image capture devices to capture one or more images of the selected storage container, (ii) process the one or more images to detect individual items and generate a current bounding box for each detected item, (iii) identify one of the current bounding boxes as relating to the added item by comparing the current bounding boxes with the bounding boxes stored in the contents record, and (iv) update the contents record of the selected storage container to include, for the added item, the specified item type and the identified current bounding box.

The storage and retrieval system according to the fifth aspect may be further configured to perform the method according to the first aspect.

According to a sixth aspect, there is provided a storage and retrieval system arranged to store items in a plurality of storage containers. The storage and retrieval system comprises: (a) a memory storing a contents record for each storage container, each contents record comprising, for each item previously determined to be contained in the storage container, an item type and a bounding box, (b) an input device arranged to receive a request to retrieve an item of a target item type from a selected storage container of the plurality of storage containers, (c) one or more image capture devices arranged to capture one or more images of the contents of the selected storage container, and (d) one or more processors. The one or more processors are configured to, upon receiving the request to retrieve an item of a target item type from a selected storage container: (i) cause the one or more image capture devices to capture one or more images of the selected storage container, (ii) process the one or more images to detect individual items and generate a current bounding box for each detected item, (iii) identify one of the current bounding boxes as relating to an item of the target item type by comparing the current bounding boxes with the bounding boxes stored in the contents record, and (iv) generate a picking instruction indicating a location of an item of the target type in the selected storage container using the identified current bounding box.

The storage and retrieval system according to the sixth aspect may be further configured to perform the method according to the second aspect.

According to a seventh aspect, there is provided a stored and retrieval system arranged to store items in a plurality of storage containers. The storage and retrieval system comprises (a) a memory storing a contents record for each storage container, each contents record comprising, for each item previously determined to be contained in the storage container, an item type and a bounding box, (b) a first input device arranged to receive an indication that an item of a specified item type has been added to the contents of a selected storage container of the plurality of storage containers, (c) a second input device arranged to receive a request to retrieve an item of the specified item type from the selected storage container, (d) one or more image capture devices arranged to capture one or more images of the contents of the selected storage container, and (e) one or more processors. The one or more processors configured to, upon receiving the indication that an item of the specified item type has been added to the contents of the selected storage container: (i) cause the one or more image capture devices to capture one or more first images of the selected storage container, (ii) process the one or more first images to detect individual items and generate a first bounding box for each detected item, (iii) identify one of the first bounding boxes as relating to the added item by comparing the first bounding boxes with the bounding boxes stored in the contents record, and (iv) update the contents record of the selected storage container to include, for the added item, the specified item type and the identified first bounding box. The one or more processors are further configured to, upon subsequently receiving a request to retrieve an item of the specified item type from the selected storage container: (v) cause the one or more image capture devices to capture one or more second images of the selected storage container, (vi) process the one or more second images to detect individual items and generate a second bounding box for each detected item, (vii) identify one of the second bounding boxes as relating to an item of the specified item type by comparing the second bounding boxes with the bounding boxes stored in the contents record, and (viii) generate a picking instruction indicating a location of an item of the specified type in the selected storage container using the identified second bounding box.

The storage and retrieval system according to the seventh aspect may be further configured to perform the method according to the first aspect and/or the method according to the second aspect.

According to an eighth aspect, there is provided a computer program comprising instructions which, when the program is executed by a computer, cause the computer to carry out the method of any of the first, second, third or fourth aspects.

According to an eighth aspect, there is provided a data processing system comprising a processor configured to carry out the method of any of the first, second, third or fourth aspects. Other variations and advantages will become apparent from the following description.

DESCRIPTION OF THE DRAWINGS

These and other aspects of the invention will now be described, by way of example only, and with reference to the accompanying drawings, in which.

In the figures, like features are denoted by like reference signs where appropriate.

DETAILED DESCRIPTION

There will now be described methods of operating a storage and retrieval system. The methods apply to storage and retrieval systems comprising a plurality of storage containers.

Figure 1:
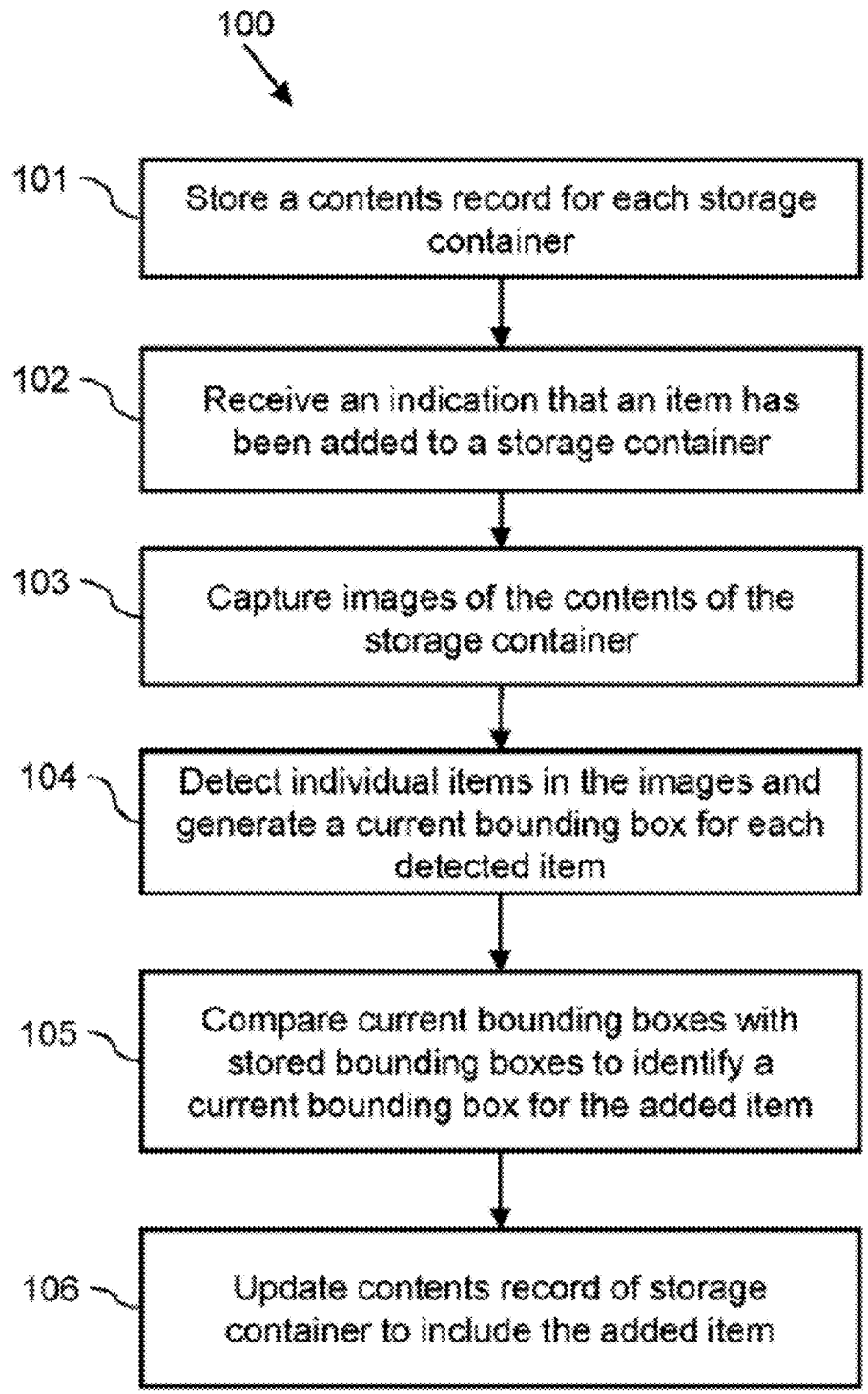
FIG. 1 is a flow diagram illustrating an example of a method of operating a storage and retrieval system.

FIG. 1 is a flow diagram illustrating an example of a method 100 of operating a storage and retrieval system, the storage and retrieval system comprising a plurality of storage containers. In particular, FIG. 1 illustrates an example of a method 100 of operating the system when adding items to a selected storage container of the plurality of storage containers.

At step 101, the system stores a contents record for each of the plurality of storage containers. For each storage container, the contents record comprises, for each item previously determined to be contained in the storage container, an item type and a bounding box. The item type comprises information that specifies an item type for an item. For example, the item type information could comprise an item type identifier such as a Stock Keeping Unit (SKU), a Universal Product Code (UPC) or an International Article Number (IAN) for an item. As will be described in more detail below, the bounding box stored in the contents record defines a last known location of the item within the storage container. For example, if the bounding box is two-dimensional, the bounding box data could comprise an x-coordinate and a y-coordinate for a center of the bounding box, and a width and height for the bounding box. Alternatively, the bounding box data for a two-dimensional bounding box could comprise an x-coordinate and a y-coordinate for a first corner of the bounding box and an x-coordinate and a y-coordinate for a diagonally opposing, second corner of the bounding box. If the bounding box is three-dimensional, then the bounding box data will also include a depth for the bounding box.

At step 102, the system receives an indication that an item of a specified item type has been added to the contents of a select storage container of the plurality of storage containers. In an exemplary implementation, step 102 may comprise receiving a specified item type for an item that is to be added to the contents of a selected storage container and then subsequently receiving an indication that the item has been added to the storage container.

By way of example, the step of receiving a specified item type for an item that is to be added to the contents of the selected storage container may comprise receiving an item type identifier from a scanner that has obtained the item type identifier by scanning a machine-readable element associated with the item. For example, such a scanner could comprise a reader device capable of reading any of a barcode, QR code, RFID tag or NFC tag that is attached to, integral with, or integrated into the item and that is arranged to provide an item type identifier. The action of scanning the item may then occur immediately before the item is added to the contents of the storage container.

The step of receiving an indication that the item has been added to the storage container may then comprise receiving the indication from an input device of the system. For example, the input device could comprise a user input device such as a graphical user interface or a user operable switch or button that is arranged generate the indication upon operation by a user. Alternatively, the input device could comprise a sensor arranged to detect that an item has been added to the storage container and to generate a corresponding indication upon activation of the sensor. For example, such a sensor could comprises a load sensor arranged to detect a change in the weight of the contents of a storage container and to generate the corresponding indication when there is a substantive increase in the weight. Alternatively, such a sensor could comprise a motion or proximity sensor that is arranged to detect when an item enters a storage container In an alternative implementation, step 102 may comprise receiving a specified item type for an item that is to be added to the contents of the selected storage container, with the receipt of the specified item type being treated as an indication that, after a short delay, the item will have been added to the has been added to the storage container. The system would then be configured to implement a delay of a pre-defined time before initiating the next step in the process.

At step 103, receipt of the indication in step 102 initiates the capture of one or more images of the contents of the selected storage container.

At step 104, the one or more images captured at step 103 are then processed to detect individual items within the image(s) and to generate a current bounding box for each detected item. Any suitable object localization method may be used to implement the image processing necessary to detect items and generate corresponding bounding boxes. For example, neural network-based approaches such as You Only Look Once (YOLO), Region-Convolutional Neural Network (R-CNN), Fast R-CNN, or Single Shot Detector (SSD) may be suitable. Each of these methods generates, for an object detected in an image, a bounding box indicating a predicted location and the predicted dimensions of the object, a class label indicating a predicted class or type for the object, and a confidence score indicating the probability that the bounding box contains an object.

In one exemplary implementation, the images are processed using an object detection algorithm that has been trained to merely identify items within an image without specifying class labels for different item types. Specifically, the object detection algorithm is trained using a training data set comprising a plurality of training images and, for each training image, a boundary box for individual items featured in the training image and a class label for each item, wherein the class label is the same for each individual item in the plurality of training images. In other words, within the training data set only a single class label (e.g. "item") is assigned to the items irrespective of the item type. As will be described in more detail below, according to the method described herein, it is not necessary for the image processing step to identify the item type. Consequently, the object detection algorithm need only be able to detect individual items within a storage container without the need to individually classify them. This simplifies the training process and also provides for greater flexibility in object detection, as there is no need for object detection algorithm to be trained to specifically detect a potentially broad range of item types, which may vary significantly and within which there may also be items of different types that have significant visual similarities. Furthermore, this also avoids the need for the retraining of the algorithm when items change or are updated.

At step 105, the system identifies one of the current bounding boxes as relating to the added item by comparing the current bounding boxes with the bounding boxes stored in the contents record. Specifically, the current bounding boxes are compared with the bounding boxes stored in the contents record to identify one of the current bounding boxes that does not match to any of the bounding boxes stored in the contents record. The unmatched current bounding box is then identified as being related to the added item. The term "match" is used herein to refer to things that are the same or similar in some respect. In particular, things that correspond in terms of their size, shape, position etc. can be said to match.

In one exemplary implementation, the step of identifying one of the current bounding boxes as relating to the added item comprises, for each of the bounding boxes stored in the contents record, matching the stored bounding box to one of the current bounding boxes. The remaining current bounding box that does not match one of the stored bounding boxes is then identified as being associated with the added item.

At step 106, the system updates the contents record of the selected storage container to include, for the added item, the specified item type and the identified current bounding box.

The method described above with reference to FIG. 1 may then further comprise, after updating the contents record of the selected storage container, transporting the selected storage container to a storage portion of the storage system. In a preferred implementation, the selected storage container would be transported to the storage portion using an automated or robotic load handling device. The method may then further comprise instructing an automated or robotic load handling device to transport the selected storage container to the storage portion.

The method described above with reference to FIG. 1 may also further comprise, upon receiving a request to retrieve an item of the specified item type, performing a lookup in the contents records of the plurality of storage containers, identifying the selected storage container as containing an item of the specified item type, and retrieving the selected storage container from the storage portion of the storage system. In a preferred implementation, the selected storage container would be retrieved from the storage portion using an automated or robotic load handling device. The method may then further comprise instructing an automated or robotic load handling device to retrieve the selected storage container from the storage portion.

In an optional implementation, the method described above with reference to FIG. 1 may further comprise a step of confirming that an item has been added to the contents of a storage container. In such an implementation, this step would be performed after receipt of the indication that an item has been added to the storage container (step 102). By way of example, the step of confirming that an item has been added to the contents of a storage container could comprise comparing a count (i.e. the number) of the current bounding boxes to a count of the stored bounding boxes. If an item has been added to the contents of the storage container, then the count of the current bounding boxes will exceed the count of the stored bounding boxes by one, and it can be confirmed that an item has been added to the contents. If the count of the current bounding boxes exceeds the count of the stored bounding boxes by more than one, then this indicates that more than one item has been added. Similarly, if the count of the current bounding boxes does not exceed the count of the stored bounding boxes by more than one (i.e. is equal to or less than), then this indicates that an item has not been added to the contents. The method may then further comprise, if the count of the current bounding boxes does not exceed the count of the stored bounding boxes by 1, generating an error or warning indication. By way of example, the step of generating an error or warning indication may comprise one or more generating a visual, audible and/or haptic indication using a user interface of the system, transmitting an error or warning message etc.

In the context of storage and warehousing, the process of adding an item to storage containers is referred to as a decant operation, as inbound items are removed from any shipping containers and/or packaging and decanted into some separate storage means. The storage and retrieval system may therefore comprise one or more decant stations at which decant operations are performed, wherein the decant station is arranged to receive storage containers and to enable items to be added to the contents of the storage containers. In such a system, at least steps 102 to 106 would then be performed whilst the selected storage container is located at a decant station of the system. The method described above with reference to FIG. 1 may then further comprise, prior to adding the item to the selected storage container, retrieving the selected storage container from the storage portion of the storage system, and delivering the storage container to the decant station of the storage system.

In one exemplary implementation, each of the contents records will be stored in association with an identifier for the relevant stored container. The method may then further comprise, prior to adding an item to a storage container, obtaining an identifier for the selected storage container. The storage container identifier may then be used to obtain the contents record for the selected storage container. By way of example, the step of obtaining an identifier for the selected storage container may comprise scanning a machine-readable element associated with the selected storage container that provides (e.g. via encoding) the storage container identifier for the selected storage container. For example, this may comprise scanning a barcode, QR code, NFC tag or RFID tag attached to or integrated with the storage container. In an alternative example, the step of obtaining an identifier for the selected storage container may comprise receiving the storage container identifier from a control system that has selected the storage container. For example, the control system may have interrogated the contents records of the plurality of storage container to select a storage container that is suitable for storing the item to be added, and may then provide the storage container identifier for the selected storage container. According to this implementation, the step of performing a lookup may then comprise identifying an item of a specified type in one of the contents records and then identifying the relevant storage container using the associated storage container identifier. A location of the storage container in the storage portion may then either be stored in association with the contents record for the storage container, such that it can be directly determined from the identified contents record, or separately in association with the storage container identifier such that the location of the storage container can then be determined by performing a further lookup using the storage container identifier from the identified contents record.

Figure 2:
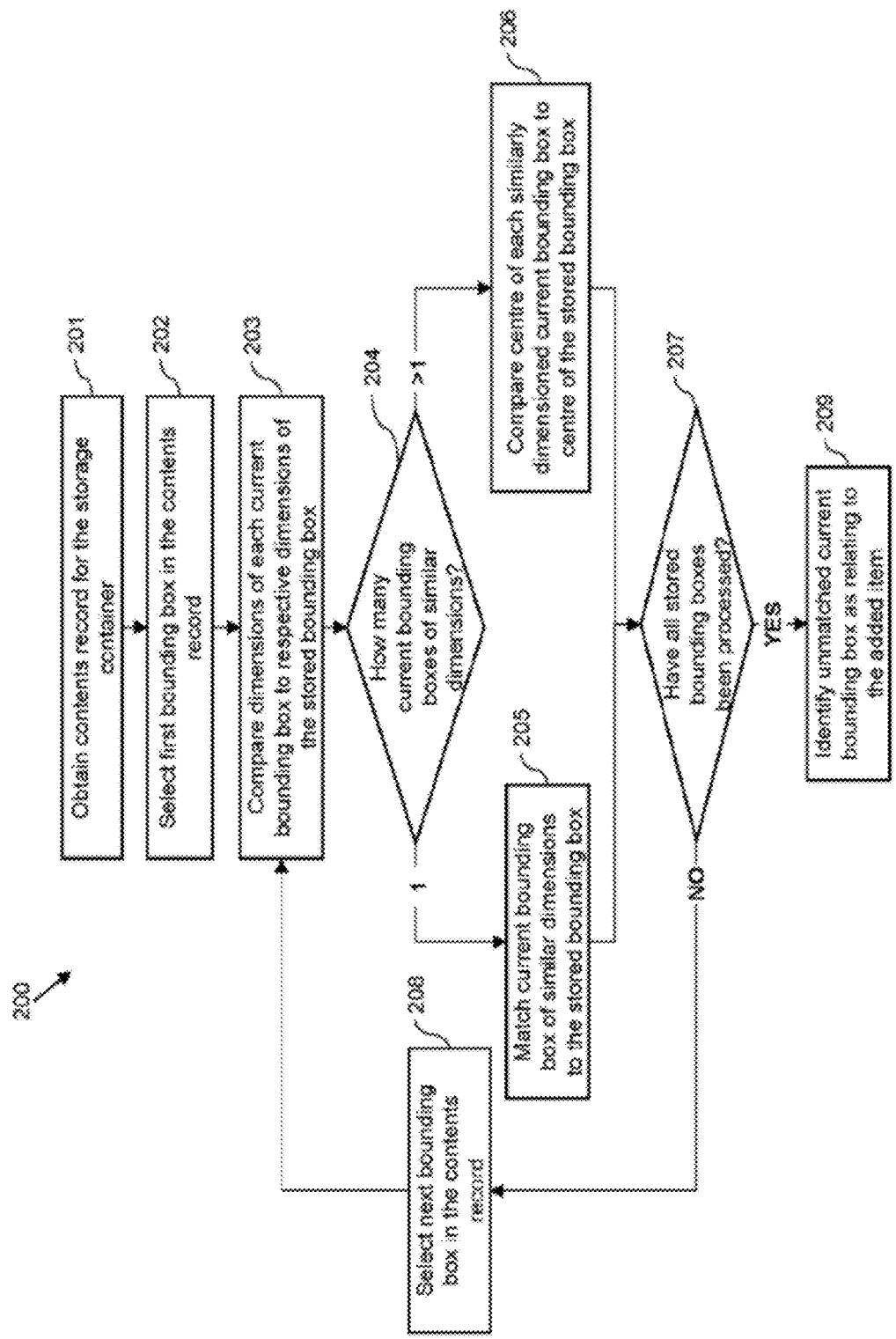
FIG. 2 is a flow diagram illustrating an example of a method of processing bounding boxes that may be used in the method of FIG. 1.

FIG. 2 is a flow diagram illustrating an example of the steps that may be performed in order to identify one of the current bounding boxes as relating to the added item in accordance with the method described above with reference to FIG. 1 (step 105).

At step 201, the contents record of the selected storage container is obtained. At step 202, a first of the bounding boxes stored in the contents record is then selected for processing.

At step 203, the dimensions of each current bounding are compared to the respective dimensions of the stored bounding box. Any of the current bounding boxes that have dimensions that correspond to the respective dimensions of the stored bounding box are then identified as a possible match for the stored bounding box. In one exemplary implementation, a current bounding box is identified as having dimensions that correspond to those of the stored bounding box if the dimensions are within a predefined range of the respective dimensions of the stored bounding box. Step 203 may then comprise, for each of the current bounding boxes, determining if the dimensions of the current bounding box are within the predefined range of the respective dimensions of the stored bounding box. By way of example, the predefined range could be 15% of the corresponding dimensions of the stored bounding box. Each of the dimensions of a current bounding box would then need to be within 15% of the respective dimensions of a stored bounding box in order to be considered to have corresponding dimensions, and to therefore be a possible match.

The selection of the predefined range to be used when identifying a possible match for a stored bounding box may depend upon the accuracy of the system when generating the bounding boxes and/or the variation in size of the types of items that are handled by the system. For example, a system handling an assortment of items in which at least some of the item types have similar dimensions may use a smaller range with the aim of ensuring greater accuracy when identifying possible matches. In contrast, a system handling assortment of items in which the different item types all have significantly different dimensions may use a larger range to ensure that possible matches are identified without increasing the frequency of inaccurate matches. Consequently, the predefined range could be any value but would preferably be from 1% to 50%, and more preferably from 1% to 33%.

At step 204, after each of the current bounding boxes have been compared to the stored bounding box, it is determined if a plurality (i.e. more than one) of the current bounding boxes have dimensions that correspond to the respective dimensions of the stored bounding box.

If only a single one of the current bounding boxes is identified as having dimensions that correspond to respective dimensions of the stored bounding box, then the process proceeds to step 205. At step 205, the single current bounding box of similar dimensions is then identified as a match for the stored bounding box and the process proceeds to step 207.

If a plurality of the current bounding boxes are identified as having dimensions that correspond to respective dimensions of the stored bounding box, such that there are a plurality of possible matches for the stored bounding box, then the process proceeds to step 206. At step 206, the stored bounding box is matched to one of the plurality of current bounding boxes that have corresponding dimensions (i.e. the possible matches identified in step 203) that has a center that is closest to a center of the stored bounding box. In other words, if it is determined that a plurality of the current bounding boxes are of similar dimensions to the stored bounding box, then the centers of each of these similarly dimensioned current bounding boxes is compared to the center of the stored bounding box to identify which of the similarly dimensioned current bounding boxes has a center that is closest to that of the stored bounding box. The similarly dimensioned current bounding box that has a center closest to that of the stored bounding box is then determined as being a match for the stored bounding box and the process proceeds to step 207.

At step 207, it is determined if all of the bounding boxes in the contents record of the selected storage container have been processed. If not all of the stored bounding boxes have been processed then the process proceeds to step 208, wherein the next bounding box in the contents record is selected for processing before returning to step 203. If all of the stored bounding boxes have been processed then the process proceeds to step 209. At step 209, with each of the stored bounding boxes having been matched to one of the current bounding boxes, the one remaining current bounding box that has not been matched to any of the stored bounding boxes is identified as being related to the added item.

The method described above with reference to FIG. 1 allows the storage and retrieval system to store items of multiple different types within each storage container, as the contents of each storage container can be accurately recorded and tracked. Furthermore, and as will be described in more detail below, the method described above with reference to FIG. 1 can also enable improvements in the efficiency and accuracy of the subsequent process of removing items from storage containers that contain items of multiple different types.

Figure 3:
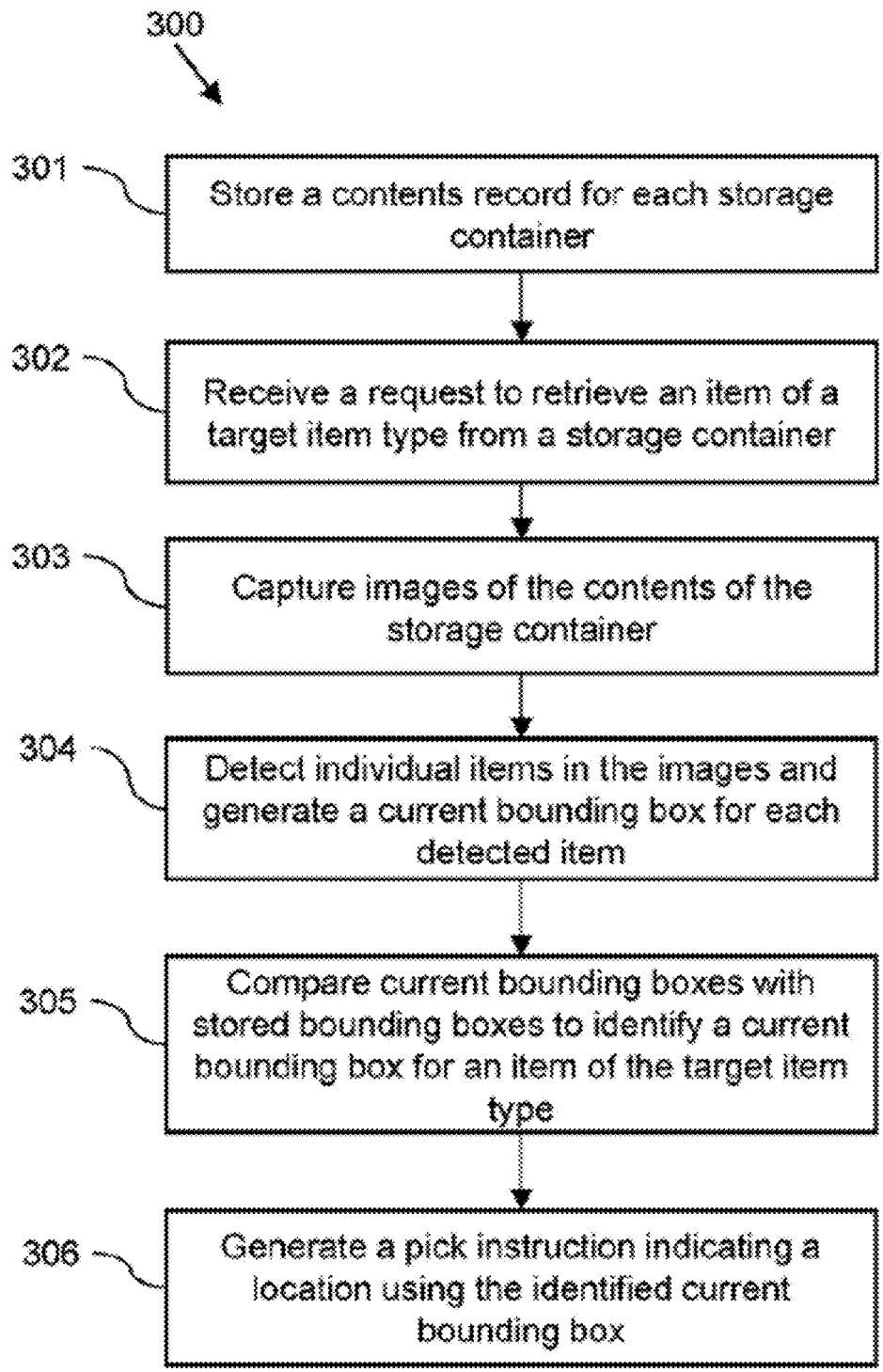
FIG. 3 is a flow diagram illustrating an example of a further method of operating a storage and retrieval system.

FIG. 3 is a flow diagram illustrating an example of a further method 300 of operating a storage and retrieval system, the storage and retrieval system comprising a plurality of storage containers. In particular, FIG. 3 illustrates an example of a method 300 of operating the system when removing items from a selected storage container of the plurality of storage containers.

At step 301, the system stores a contents record for each of the plurality of storage containers. For each storage container, the contents record comprises, for each item previously determined to be contained in the storage container, an item type and a bounding box. For example, the contents record for each storage container may be created using the method described above with reference to FIG. 1. In particular, for each instance of an item being added to a storage container, the contents record for the storage container may be updated with the specified item type of the added item and the current bounding box as identified according to the methods described above with reference to FIGS. 1 and/or 2.

At step 302, the system receives a request to retrieve an item of a target item type from a selected storage container of the plurality of storage containers. In an exemplary implementation, step 302 may comprise receiving a request to retrieve an item of a target item type, and then subsequently performing a lookup in the contents records of the plurality of storage containers to select a storage container for which the contents record includes an item of the target item type. By way of example, the step of receiving a request to retrieve an item of a target item type may comprise receiving an order from an ordering system, the order comprising at least one item of the target item type. The system may then be configured to fulfil the order by selecting a storage container for which the contents record indicates that the storage container contains an item of the target item type and retrieving the selected storage container from a storage portion of the storage system. In an exemplary implementation, the step of performing a lookup may comprise identifying an item of the target type in one of the contents records and then identifying the relevant storage container using a storage container identifier that is stored in association with the contents record.

At step 303, receipt of the request in step 302 initiates the capture of one or more images of the contents of the selected storage container.

At step 304, the one or more images captured at step 303 are then processed to detect individual items within the one or more images and to generate a current bounding box for each detected item. As described above in relation to FIG. 1, any suitable object localization method may be used to implement the image processing necessary to detect items and generate corresponding bounding boxes. For example, neural network-based approaches such as You Only Look Once (YOLO), Region-Convolutional Neural Network (R-CNN), Fast R-CNN, or Single Shot Detector (SSD) may be suitable.

At step 305, the system identifies one of the current bounding boxes as relating to an item of the target item type by comparing the current bounding boxes with the bounding boxes stored in the contents record. Specifically, the current bounding boxes are compared with the bounding boxes stored in the contents record to identify one of the current bounding boxes that matches the bounding boxes stored in the contents record for the an item of the target item type.

In one exemplary implementation, the step of identifying one of the current bounding boxes as relating to an item of the target item type comprises, for each of the bounding boxes stored in the contents record, matching the stored bounding box to one of the current bounding boxes. The current bounding box that matches the bounding box stored in the contents record for an item of the target item type can then be readily identified.

At step 306, the system generates a picking instruction indicating a location of an item of the target type in the selected storage container using the identified current bounding box. In an exemplary implementation, the operation of picking an item from a storage container may be implemented manually (i.e. by a human picking operative or picker). In such an implementation, step 307 may comprise generating a visual representation of the identified current bounding box on a captured image of the contents of the storage container, and displaying a combined image comprising the captured image together with the visual representation of the bounding box. This combined image is displayed on a display device that is visible to the human picker such that the picking instruction would not only indicate the target item type but also the location of an item of the target item type within the selected storage container. In doing so, the method 300 increases both the speed and the accuracy of manually removing items (i.e. picking) from a storage container. Additionally, or as an alternative, step 307 may comprise using one or more light sources to at least partially illuminate the location of the item of the target type in the storage container as defined by the identified bounding box. By way of example, a directable light source (e.g. a directional light source on a motorized mount) could be directed to illuminate the location. By way of further example, an array of stationary light sources could be selectively activated so as to at least partially illuminate the location.

In an alternative implementation, the operation of picking an item from a storage container may be implemented automatically (e.g. using a robot). In such an implementation, step 307 may comprise transmitting a picking instruction message to a robotic picking device, the picking instruction message include the location of the item of the target type in the storage container as defined by the identified bounding box.

The method described above with reference to FIG. 3 may then further comprise, upon confirmation that an item of the target item type has been removed from the contents of the storage container, updating the contents record of the storage container to reflect the removal of the item from the storage container. In an exemplary implementation, the step of updating of the contents record to reflect the removal of the item from the storage container may comprise deleting information relating to the removed item from the contents record. In particular, this may comprise deleting the item type and the bounding box of the removed item from the contents record. In an alternative implementation, the step of updating of the contents record to reflect the removal of the item from the storage container may comprise updating the contents record to include an indication that the removed item is no longer contained in the storage container. For example, this indication could comprise the date and time at which the item was removed, which could then be used to track the contents of a storage container over time.

In an optional implementation, the method described above with reference to FIG. 3 may further comprise, after matching each of the stored bounding boxes to one of the current bounding boxes, updating the contents record of the storage container to replace the stored bounding boxes with the current bounding boxes. In other words, for each item in the contents record, the bounding boxes stored in the contents record are updated with current bounding box data for each item in the contents record. This ensures that the stored bounding box data is refreshed each time that a bounding box is generated for an item in the contents record. The updating of the contents record can be performed immediately after each of the stored bounding boxes is matched to one of the current bounding boxes or, alternatively, after it has been confirmed whether or not an item has been removed from the contents of the storage container. If the latter, then the contents record can be updated both to reflect the removal of the item from the storage container and to replace the stored bounding boxes with the current bounding boxes for each item that remains in the storage container.

In an optional implementation, the method described above with reference to FIG. 3 may further comprise a step of confirming that selected storage container contains an expected number of items. In such an implementation, this step would be performed after generating a current bounding box for each detected item (step 304) and before identifying one of the current bounding boxes as relating to an item of the target item type (step 305). By way of example, the step of confirming that selected storage container contains an expected number of items could comprise comparing a count (i.e. the number) of the current bounding boxes to a count of the stored bounding boxes. If the selected storage container contains an expected number of items, then the count of the current bounding boxes will equal the count of the stored bounding boxes. If the count of the current bounding boxes does not equal the count of the stored bounding boxes, then this indicates the storage container does not contain the expected number of items, which may cause problems in completing a pick operation. The method may then further comprise, if the count of the current bounding boxes does not equal the count of the stored bounding boxes, generating an error or warning indication. By way of example, the step of generating an error or warning indication may comprise one or more generating a visual, audible and/or haptic indication using a user interface of the system, transmitting an error or warning message etc.

The method described above with reference to FIG. 3 may also further comprise, after generating the picking instruction, obtaining information identifying an item type of an item that has been picked from the contents of the storage container and comparing the identified item type to the target item type. By way of example, the step of obtaining information identifying an item type of an item that has been picked from the contents of the selected storage container may comprise receiving an item type identifier from a scanner that has obtained the item type identifier by scanning a machine-readable element associated with the item. For example, such a scanner could comprise a reader device capable of reading any of a barcode, QR code, RFID tag or NFC tag that is attached to, integral with, or integrated into the item and that is arranged to provide an item type identifier. The method may then further comprise, if it is determined that the identified item type matches the target item type, confirming that an item of the target item type has been removed and, if it is determined that the identified item type does not match the target item type, generating a notification that the target item has not been removed. In particular, if it is determined that the identified item type does not match the target item type then this would suggest that an item of an incorrect type has been removed from the selected storage container. The step of generating a notification that the target item has not been removed may then comprise generating a further picking instruction indicating that an item of the target type has not yet been removed from the storage container, and preferably that the incorrectly picked item is to be returned to the storage container.

Furthermore, the method described above with reference to FIG. 3 may further comprise, prior to capturing one or more images of the selected storage container, retrieving the selected storage container from a storage portion of the storage system. In a preferred implementation, the selected storage container would be retrieved from the storage portion using an automated or robotic load handling device. The method may then further comprise instructing an automated or robotic load handling device to retrieve the selected storage container from the storage portion.

The method described above with reference to FIG. 3 may also further comprise, after updating the contents record of the storage container to reflect the removal of the item from the storage container, transporting the storage container to the storage portion of the storage system. In a preferred implementation, the selected storage container would be transported to the storage portion using an automated or robotic load handling device. The method may then further comprise instructing an automated or robotic load handling device to transport the selected storage container from the storage portion.

In the context of storage and warehousing, the process of removing an item from a storage container is referred to as a picking operation, as outbound items are picked from storage containers and consolidated into orders. The storage and retrieval system may therefore comprise one or more pick stations at which picking operations are performed, wherein the pick station is arranged to receive storage containers and to enable items to be removed from the contents of the storage containers. In such a system, at least steps 303 to 306 would then be performed whilst the selected storage container is located at a pick station of the system. The method described above with reference to FIG. 3 may then further comprise, prior to removing the item from the selected storage container, retrieving the selected storage container from the storage portion of the storage system, and delivering the storage container to the pick station of the storage system.

Figure 4:
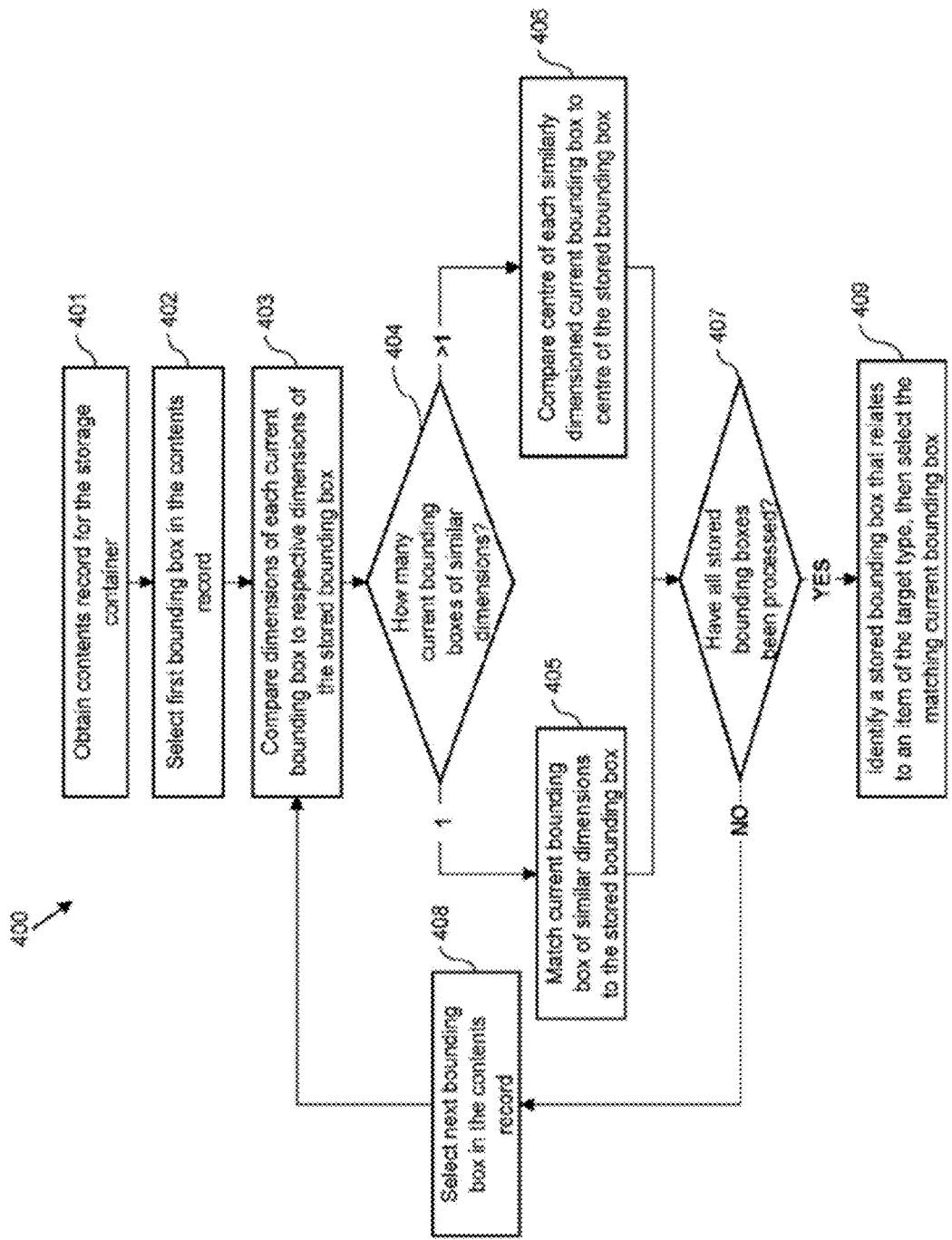
FIG. 4 is a flow diagram illustrating an example of a method of processing bounding boxes that may be used in the method of FIG. 3.

FIG. 4 is a flow diagram illustrating an example of the steps that may be performed in order to identify one of the current bounding boxes as relating to an item of the target item type in accordance with the method described above with reference to FIG. 3 (step 305).

With the exception of the final step (step 409), the steps of the method 400 of FIG. 4 are the same as those of FIG. 2, so for the sake of brevity the preceding steps (steps 401 to 408) will not be described again here. In the method 200 described above with reference to FIG. 2, the final step (step 209) involves identifying the one remaining current bounding box that has not been matched to any of the stored bounding boxes as being related to the added item. In contrast, in the final step of the method 400 illustrated in FIG. 4 (step 409), with each of the stored bounding boxes having been matched to one of the current bounding boxes, the current bounding box that relates to an item of the target item type is identified by using the contents record to identify which of the stored bounding boxes relates to an item of the target item type and then selecting the current bounding box that has been matched to the identified stored bounding box.

In a preferred implementation, any inbound items that are to be stored in the storage and retrieval system are decanted into the storage containers using the method described above with reference to FIG. 1. Then any outbound items that are to be retrieved/removed from the storage and retrieval system are picked from the storage containers using the method described above with reference to FIG. 3.

Figure 5:
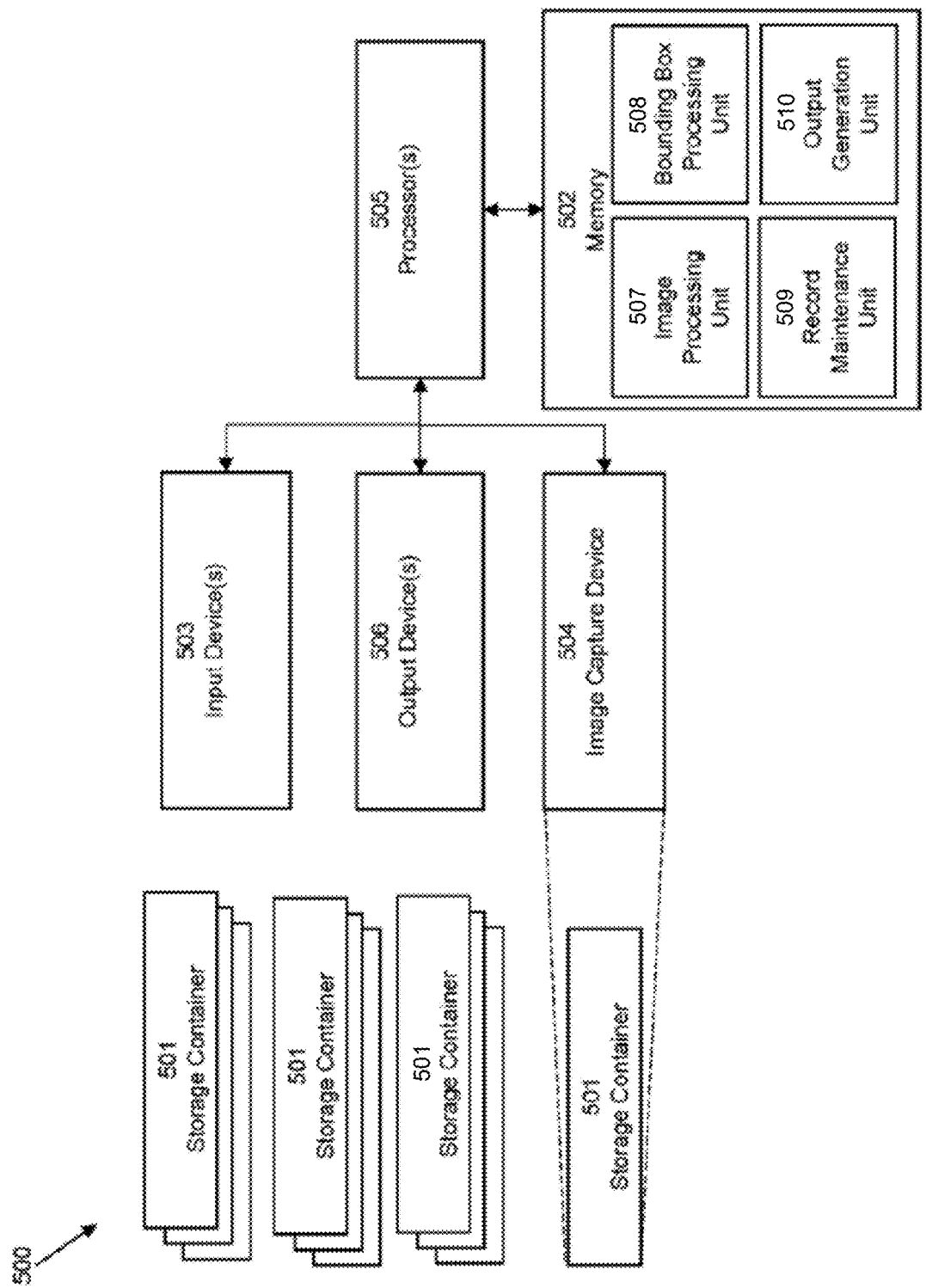
FIG. 5 is a schematic illustration of an example of a storage and retrieval system that is suitable for implementing the methods described herein.

FIG. 5 is a schematic illustration of an example of a storage and retrieval system that is suitable for implementing the methods described above. As a schematic illustration, FIG. 5 only shows the elements and functional entities that are required for understanding the arrangement with other components having been omitted for the sake of simplicity. Consequently, the implementation of the elements and functional entities may vary from that shown in FIG. 5. The connections shown in FIG. 5 are logical connections, and the actual physical connections may be different. It is apparent to a person skilled in the field that the arrangement may also comprise other functions and structures.

In the example of FIG. 5, the storage and retrieval system 500 is implemented as a combination of computer hardware and software. The storage and retrieval system 500 is arranged to store items in a plurality of storage containers 501 and comprises a memory 502, one or more input devices 503, at least one image capture device 504 and one or more processors 505. The system 500 may also comprise one or more output devices 506.

At least one of the one or more input devices 503 is arranged to obtain item type information for an item that is to be added to and/or removed from the contents of a selected storage container 501. By way of example, and as described above, the one or more input devices 503 could comprise a scanner that is arranged to scan a machine-readable element associated with an item that is to be added to the contents of the storage container 501 in order to obtain an item type identifier for the item. By way of further example, the one or more input devices 503 could comprise a receiver that is arranged to receive item type information for an item that is to be removed from the contents of a selected storage container 501. In particular, the receiver could be arranged to receive a request to retrieve an item of a target item type from storage within the system 500, with the request being received using either wireless or wired communication.

At least one of the one or more input devices 503 may also be arranged to receive an indication that an item has been added to and/or has been removed from the contents of a storage container. By way of example, and as described above, the one or more input devices 503 could comprise a user operable switch or button arranged generate the indication that an item has been added to or removed from a storage container upon operation by a user. As an alternative example, and as described above, the one or more input devices 503 could comprise a sensor arranged to detect that an item has been added to or removed from a storage container, and to generate a corresponding indication upon activation of the sensor.

The one or more image capture devices 504 are arranged to capture images of the contents of a selected storage container. As will be described in more detail below, the image capture devices 504 could be provided at an inventory handling station, such as a pick, decant or combined pick and decant station of the system 500. The image capture devices 504 would then be arranged to capture images of the inside of a storage container that is presented at the inventory handling station. In an optional implementation, the one or more image capture devices 504 may comprise a depth camera that is configured to capture distance/depth information for a captured image (e.g. a stereo camera, a combined camera and depth sensor, a structured light camera etc.). The distance/depth information could then be used to generate three-dimensional bounding boxes for each of the detected items, with the use of three-dimensional, rather than two-dimensional, bounding boxes improving the extent to which they can be distinguished based on their dimensions.

At least one of the one or more output devices 506 may be arranged to provide feedback to a user of the system 500. By way of example, one of the one or more output devices 506 could comprise a display or graphical user interface that is arranged to display information relating to the progress, success and/or failure of each of the steps of the method described herein.

At least one of the one or more output devices 506 may be arranged to provide a picking instruction relating to the removal of an item from a selected storage container, wherein the picking instruction is arranged to indicate a location of an item of a target type in the selected storage container. By way of example, and as described above, one of the one or more output devices 506 could comprise a display or graphical user interface that is arranged to display a combined image comprising a captured image of the storage container together with a visual representation of a bounding box identified as relating to an item of the target type, thereby highlighting the expected location of the item in the storage container. By way of further example, and as described above, one of the one or more output devices 506 could comprise a directable light source that can be directed to illuminate at least a part of the location of an item of the target type in the storage container. As a yet further example, one of the one or more output devices 506 could comprise a transceiver arranged to transmit a picking instruction message to an automated or robotic picking device, the picking instruction message including the location of the item of the target type in the storage container as defined by the identified bounding box.

The memory 502 stores the various programs/computer-executable instructions that are implemented by the processor(s) 505. The memory 502 also provides a storage unit for any required data such as a contents record for each of the storage containers 501. The contents record of each storage container 501 comprises, for each item that has been determined to be contained in the storage container, an item type and a bounding box for the item. As described above, the bounding box defines a last known location of the item within the storage container, with the bounding box having been generated from captured images of the storage container.

The programs/computer-executable instructions stored in the memory 502, and implemented by the processor(s) 505, include but are not limited to an image processing unit 507, a bounding box processing unit 508, a record maintenance unit 509, and an output generation unit 510. The storage system processor(s) 505 are then configured to execute the programs/computer-executable instructions stored in the memory 502 and in doing so control at least the input device(s) 503, the image capture device(s) 504 and the output device(s) 506. The image processing unit 507 is configured to process the images captured by the image capture device(s) 504 in order to detect individual items and generate a current bounding box for each detected item. The bounding box processing unit 508 is then configured compare the current bounding boxes generated by the image processing unit 507 with the bounding boxes stored in the contents record for a select storage container and thereby identify the current bounding box that relates to either an item that has been added to the storage container (i.e. if implemented for a decant operation) or an item that is to be removed from the storage container (i.e. if implemented for a pick operation). The record maintenance unit 509 is configured to maintain the contents record of each storage container. Specifically, when it has been determined that an item has been added to a storage container, the record maintenance unit 509 is configured to update the contents record of the storage container to include, for the added item, the specified item type and the identified current bounding box. When it has been determined that an item has been removed from a storage container, the record maintenance unit 509 is configured to update the contents record of the storage container to reflect the removal of the item from the storage container (e.g. by deleting the details of the removed item from the contents record or by adding an indication that the removed item is no longer in the storage container). The output generation unit 510 is then configured to generate any associated outputs that are to be emitted by the one or more output devices 506. For example, the output generation unit 510 may be configured to generate the above described picking instruction (e.g. for display on a display device, by at least partially illuminating a target item, or as an instruction message to be transmitted to an automated picking device).

Figure 6:
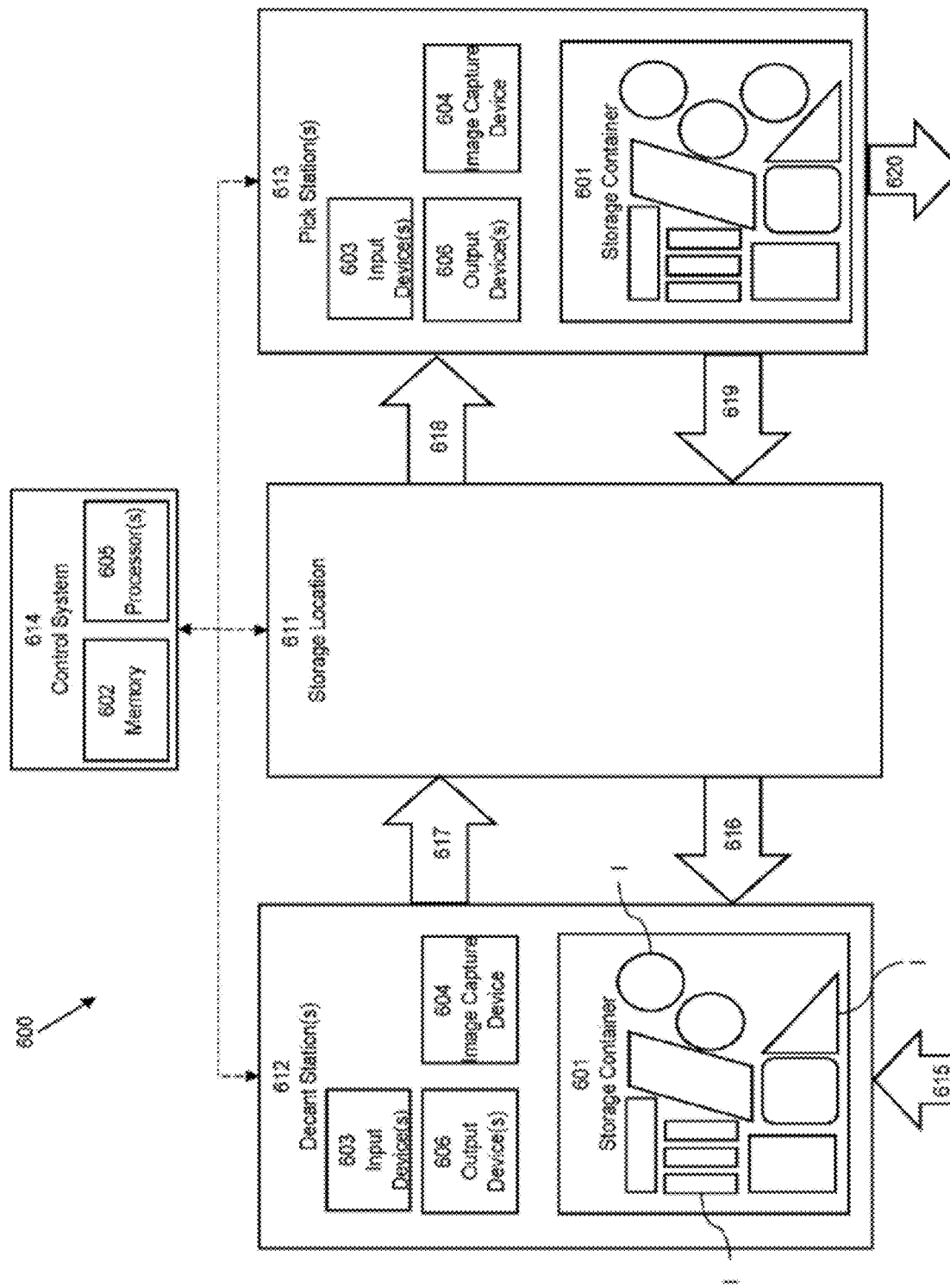
FIG. 6 is a schematic illustration of a further example of a storage and retrieval system that is suitable for implementing the methods described herein.

FIG. 6 is a schematic illustration of a detailed example of a storage and retrieval system 600 that is suitable for implementing the methods described above. In the example FIG. 6, the storage and retrieval system 600 comprises a storage portion/location 611, one or more decant stations 612, one or more pick stations 613, and a control system 614.

The storage portion 611 of the system 600 is arranged to store the plurality of storage containers 601. By way of example, the storage portion 611 could be the same or similar to that disclosed in WO2015/185628A1, wherein the storage containers are arranged in stacks within a grid structure. In the arrangement disclosed in WO2015/185628A1, the storage containers within the storage portion are accessed by load handling devices operative on tracks located on the top of the grid structure, with the load handling devices then transporting the storage containers between the storage portion and other parts of the system. By way of further example, the storage portion 611 could comprise a number of racks on which the storage containers 601 are held when stored within the storage portion 611.

Each of the one or more decant stations 612 is arranged to receive storage containers 601 and to enable items to be added to the contents of the received storage containers 601.

FIG. 6 therefore illustrates a storage container 601 containing a plurality of items (I) of various item types that has been presented to a decant station 612 in order to receive one or more items. Each decant station 612 comprises one or more image capture devices 604 that are arranged to capture images of the contents of the storage containers. Each decant station 612 may also further comprise one or more input devices 603 and/or one or more output devices 606 such as those described above. By way of example, each decant station 612 could comprise input devices 603 including a scanner or reader for obtaining an item type from a machine-readable element associated with an item that is to be added to a storage container and a user operable button for generating an indication that an item has been added to the storage container. Each decant station 612 could then also comprise an output device 606 in the form of display device for displaying feedback. For example, such a display device could be integral to the decant station 612 or could be provided on a portable device (e.g. a smart phone, smart wearable or tablet computer) having a display, with the portable device being configured to communicate with the decant station 612 in order to receive data for display. In an alternative implementation, one or more of the decant stations 612 could comprise a robotic item handling device that is configured to add inbound items into storage containers presented at the decant station 612.

Each of the one or more pick stations 613 is arranged to receive storage containers 601 and to enable items to be removed from the contents of the received storage containers 601. FIG. 6 therefore illustrates a storage container 601 containing a plurality of items (I) of various item types that has been presented to a pick station 613 in order for one or more items to be removed. Each pick station 613 comprises one or more image capture devices 604 that are arranged to capture images of the contents of the storage containers. Each pick station 613 may also further comprise one or more input devices 603 and/or one or more output devices 606 such as those described above. By way of example, each pick station 613 could comprise an output device 606 in the form of display device for displaying a pick instruction (e.g. a captured image of a storage container together with a visual representation of a bounding box identified as relating to an item of the target type) and for displaying any feedback. Such a display device could be integral to the pick station 613 or could be provided on a portable device (e.g. a smart phone, smart wearable or tablet computer) having a display, with the portable device being configured to communicate with the pick station 613 in order to receive data for display. Each pick station 613 could then also comprise a scanner or reader for obtaining an item type from a machine-readable element associated with an item that has been removed from a storage container. In an alternative implementation, one or more of the pick stations 613 could comprise a robotic item handling device that is configured to remove outbound items from storage containers presented at the pick station 613.

The control system 614 is then configured to implement the computer processing required by the system 600 and therefore provides the memory 602 and processors 605, and optionally any external interfaces of the system 600. Whilst the control system 614 is illustrated in FIG. 6 as being centralized, with interfaces to the decant stations 612, pick stations 613 and, if needed, to the storage portion 611, the control system 614 could be at least partially distributed such that each decant station 612 and pick station 613 comprises memory and processors that cooperate to implement the control system 614.

The system 600 then further comprises transport devices 615 to 620 that are each arranged to transport either items or storage containers. In particular, the system 600 comprises one or more inbound item transport devices 615 that are configured to transport inbound items to the decant stations 612 so that these inbound items can be decanted into storage containers. The system 600 also comprises one or more container transport devices 616, 617 that are configured to transport storage containers between the decant stations 612 and the storage portion 611. The system 600 then further comprises one or more container transport devices 618, 619 that are configured to transport storage containers between the storage portion 611 and the pick stations 613. The system 600 also comprises one or more outbound item transport devices 620 that are configured to transport outbound items away from the pick stations 613. In this regard, outbound items could either be transported individually or could be picked into an outbound container that is able to hold a plurality of items (e.g. at least part of an order) with outbound items then being transported away from a pick station 613 in such an outbound container. Each transport device 615 to 620 could comprise any suitable transports means. For example, each transport device 615 to 620 could comprise one or more of a conveyor (e.g. a roller conveyor or a belt conveyor), or an automated or autonomous load handling vehicle (e.g. an automated guided vehicle (AGV) which is capable of following fixed routes, or an autonomous mobile robot (AMR) which is capable of planning its own routes).

Figure 7:
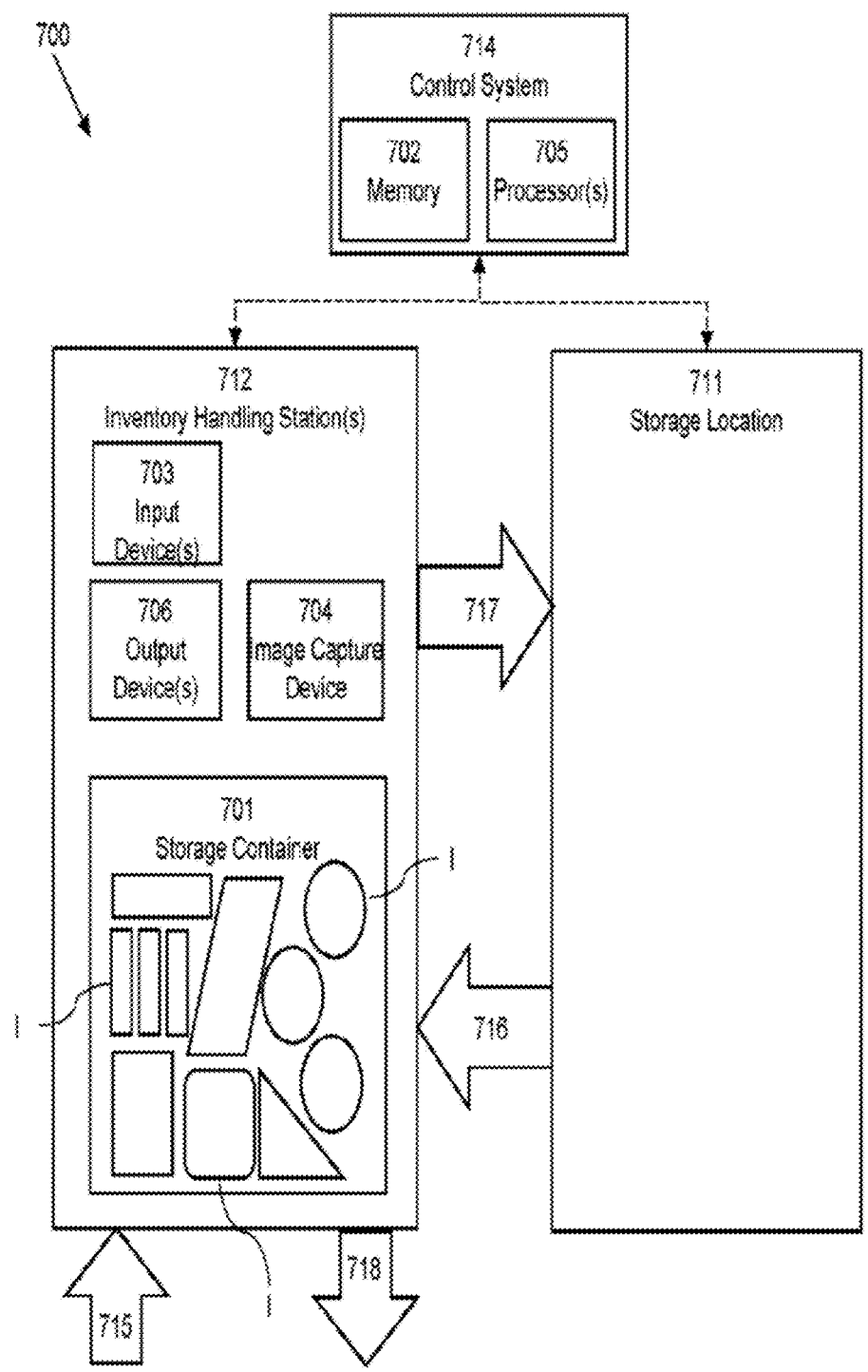
FIG. 7 is a schematic illustration of a yet further example of a storage and retrieval system that is suitable for implementing the methods described herein.

FIG. 7 is a schematic illustration of a further detailed example of a storage and retrieval system 700 that is suitable for implementing the methods described above. The system 700 illustrated in FIG. 7 is essentially the same as that described with reference to FIG. 6, particularly with respect to parts 702-706 and 714. The main difference between the system 700 illustrated in FIG. 7 and that described with reference to FIG. 6 is that, rather than comprising separate decant and pick stations, the system 700 of FIG. 7 comprises inventory handling stations 712 that are used to implement both decant and picking operations. In an exemplary implementation, the inventory handling stations 712 are used to perform only one of a decant operation and a picking operation for each storage container that is presented at the inventory handling station 712. However, in an alternative implementation, the inventory handling stations 712 could be configured to implement both decanting and picking operations for each storage container that is presented at the inventory handling station 712. For example, when a storage container 701 is presented at an inventory handling station 712 (e.g. having been transported from the storage portion 711) an outbound item could first be picked from the storage container 701 with an inbound item then being added to the storage container 701 before it is returned to the storage portion 711.

As a consequence of the inventory handling stations 712 being used to implement both decant and picking operations, the transport devices 715 to 718 are arranged to transport items or storage containers to and from the inventory handling stations 712. In particular, the system 700 comprises one or more inbound item transport devices 715 that are configured to transport inbound items to the inventory handling stations 712 so that these inbound items can be decanted into storage containers. The system 700 also comprises one or more container transport devices 716, 717 that are configured to transport storage containers between the inventory handling stations 712 and the storage portion 611. The system 700 also comprises one or more outbound item transport devices 718 that are configured to transport outbound items away from the inventory handling stations 712.

It will be appreciated that various features described herein can take the form of a computer program embodied as a computer-readable medium having computer executable code for use by or in connection with a computer. For the purposes of this description, a computer readable medium can be any tangible apparatus that can contain, store, communicate, propagate, or transport the program for use by or in connection with the computer. Moreover, a computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

The flow diagrams in the figures illustrate the architecture, functionality, and operation of possible implementations of methods according to various implementations. In this regard, each block in the flow diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the flow diagrams, and combinations of blocks in the flow diagrams, can be implemented by special purpose hardware-based systems that perform the specified functions or acts, or combinations of special purpose hardware and computer instructions.

It will be appreciated that the features described hereinabove may all be used together in a single system. In other embodiments of the invention, some of the features may be omitted. The features may be used in any compatible arrangement. Many variations and modifications not explicitly described above are possible without departing from the scope of the invention as defined in the appended claims.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

What is claimed is:

1. A computer-implemented method of operating a storage and retrieval system comprising a plurality of storage containers, the method comprising:
    for each respective storage container, storing a contents record for the respective storage container, the contents record comprising, for each item previously determined to be contained in the respective storage container, an item type and a bounding box;
    upon receiving an indication that an item of a specified item type has been added to contents of a selected storage container of the plurality of storage containers:
        capturing one or more images of the contents of the selected storage container;

processing the one or more images to detect individual items;

generating a current bounding box for each detected individual item;

identifying one current bounding box as relating to an added item by comparing current bounding boxes with bounding boxes stored in the contents record; and updating the contents record of the selected storage container to include, for the added item, the specified item type and the identified one current bounding box.

2. The method of claim 1, wherein the step of identifying the one current bounding box as relating to the added item comprises comparing the current bounding boxes with the bounding boxes stored in the contents record to identify the one current bounding box that does not match any of the bounding boxes stored in the contents record.

3. The method of claim 2, wherein the step of identifying the one current bounding box as relating to the added item comprises:

for each of the bounding boxes stored in the contents record, matching a stored bounding box to one of the current bounding boxes; and identifying the current bounding box that does not match one of the stored bounding boxes as relating to the added item.

4. The method of claim 3, wherein the step of matching the stored bounding box to one of the current bounding boxes comprises:

identifying any of the current bounding boxes that have dimensions that correspond to respective dimensions of the stored bounding box.

5. The method of claim 3, wherein the step of matching the stored bounding box to one of the current bounding boxes comprises:

identifying any of the current bounding boxes that have dimensions that are within a predefined range of respective dimensions of the stored bounding box.

6. The method of claim 5, wherein the step of matching the stored bounding box to one of the current bounding boxes comprises:

for each of the current bounding boxes, determining if dimensions of the current bounding box are within the predefined range of the respective dimensions of the stored bounding box.

7. The method of claim 4, wherein the step of matching the stored bounding box to one of the current bounding boxes further comprises:

if only one current bounding box is identified as having dimensions that correspond to the respective dimensions of the stored bounding box, then matching the identified only one current bounding box to the stored bounding box.

8. The method of claim 4, wherein the step of matching the stored bounding box to one of the current bounding boxes further comprises:

if a plurality of the current bounding boxes are identified as having dimensions that correspond to respective dimensions of the stored bounding box, then matching the stored bounding box to one of the plurality of current bounding boxes that has a center that is closest to a center of the stored bounding box.

9. A computer-implemented method of operating a storage and retrieval system comprising a plurality of storage containers, the method comprising:

for each respective storage container, storing a contents record for the respective storage container, the contents record comprising, for each item previously determined to be contained in the respective storage container, an item type and a bounding box; and upon receiving a request to retrieve an item of a target item type from a selected storage container of the plurality of storage containers:

capturing one or more images of the selected storage container;

processing the one or more images to detect individual items;

generating a current bounding box for each detected individual item;

identifying one current bounding box as relating to an item of the target item type by comparing current bounding boxes with bounding boxes stored in the contents record; and generating a picking instruction indicating a location of an item of the target item type in the selected storage container using the identified one current bounding box.

10. The method of claim 9, further comprising:

upon confirmation that an item of the target item type has been removed from contents of the selected storage container, updating the contents record of the selected storage container to reflect removal of the item from the selected storage container.

11. The method of claim 9, wherein the step of identifying the one current bounding box as relating to an item of the target item type comprises comparing the current bounding boxes with the bounding boxes stored in the contents record to identify the one current bounding box that matches the bounding box stored in the contents record for an item of the target item type.

12. The method of claim 9, wherein the step of identifying the one current bounding box as relating to an item of the target item type comprises:

for each of the bounding boxes stored in the contents record, matching a stored bounding box to one of the current bounding boxes; and identifying the current bounding box that matches the bounding box stored in the contents record for an item of the target item type.

13. The method of claim 12, wherein the step of matching the stored bounding box to one of the current bounding boxes comprises:

identifying any of the current bounding boxes that have dimensions that correspond to respective dimensions of the stored bounding box.

14. The method of claim 12, wherein the step of matching the stored bounding box to one of the current bounding boxes comprises:

determining if any of the current bonding boxes have dimensions that are within a predefined range of the respective dimensions of the stored bounding box.

15. The method of claim 14, wherein the step of matching the stored bounding box to one of the current bounding boxes comprises:

for each of the current bounding boxes, determining if the dimensions of the current bounding box are within the predefined range of the respective dimensions of the stored bounding box.

16. The method of claim 12, wherein the step of matching the stored bounding box to one of the current bounding boxes further comprises:

if only one current bounding box is identified as having dimensions that correspond to respective dimensions of the stored bounding box, then matching the identified only one current bounding box to the stored bounding box.

17. The method of claim 12, wherein the step of matching the stored bounding box to one of the current bounding boxes further comprises:
if a plurality of the current bounding boxes are identified as having dimensions that correspond to respective dimensions of the stored bounding box, matching the stored bounding box to one of the plurality of the current bounding boxes that has a center that is closest to a center of the stored bounding box.

18. A storage and retrieval system arranged to store items in a plurality of storage containers, the storage and retrieval system comprising:
a memory storing a contents record for each respective storage container, each contents record comprising, for each item previously determined to be contained in the respective storage container, an item type and a bounding box;
a first input device arranged to receive an indication that an item of a specified item type has been added to contents of a selected storage container of the plurality of storage containers and/or a second input device arranged to receive a request to retrieve an item of the specified item type from the selected storage container;
one or more image capture devices arranged to capture one or more images of the contents of the selected storage container; and
one or more processors configured to:

upon receiving the indication that an item of the specified item type has been added to the contents of the selected storage container:
cause the one or more image capture devices to capture one or more first images of the selected storage container;
process the one or more first images to detect individual items and generate a first bounding box for each detected item;
identify one bounding box as relating to an added item by comparing current bounding boxes with bounding boxes stored in the contents record; and
update the contents record of the selected storage container to include, for the added item, the specified item type and an identified one bounding box; and/or
upon subsequently receiving a request to retrieve an item of the specified item type from the selected storage container:
cause the one or more image capture devices to capture one or more second images of the selected storage container;
process the one or more second images to detect individual items and generate a second bounding box for each detected item;
identify one second bounding box as relating to an item of the specified item type by comparing the current bounding boxes with the bounding boxes stored in the contents record; and
generate a picking instruction indicating a location of an item of the specified item type in the selected storage container using an identified second bounding box.

* * * * *